(12) United States Patent
Yokozeki et al.

(10) Patent No.: US 6,966,194 B2
(45) Date of Patent: Nov. 22, 2005

(54) REFRIGERATING MACHINE

(75) Inventors: Atsuhiko Yokozeki, Shizuoka (JP);
Susumu Nakayama, Shizuoka (JP);
Kenji Tojo, Moriya (JP); Akira Saruta,
Chiba (JP); Mutsunori Matsunaga,
Shizuoka (JP); Satoshi Kikuchi,
Hitachi (JP)

(73) Assignee: Hitachi, Ltd., Tokyo (JP), Trustee, for the benefit of Hitachi Air Conditioning System CO, Ltd.

( * ) Notice: Subject to any disclaimer, the term of this patent is extended or adjusted under 35 U.S.C. 154(b) by 0 days.

(21) Appl. No.: 11/009,014

(22) Filed: Dec. 13, 2004

(65) Prior Publication Data

US 2005/0086960 A1    Apr. 28, 2005

Related U.S. Application Data

(63) Continuation of application No. 10/614,018, filed on Jul. 8, 2003, now Pat. No. 6,832,488.

(30) Foreign Application Priority Data

Sep. 4, 2002    (JP) .............................. 2002-258375

(51) Int. Cl.$^7$ .................. F25B 41/00; F25B 49/00; F25B 1/00
(52) U.S. Cl. ................... 62/196.3; 62/228.3; 62/230; 62/510
(58) Field of Search ............... 62/193.2, 196.3, 62/175, 510, 228.3, 230; 310/162, 211; 318/700; 417/286, 288, 304, 307

(56) References Cited

U.S. PATENT DOCUMENTS

| | | | | |
|---|---|---|---|---|
| 6,305,187 | B1 * | 10/2001 | Tsuboe et al. | 62/505 |
| 6,408,645 | B1 * | 6/2002 | Tsuboe et al. | 62/505 |
| 2001/0050541 | A1 | 12/2001 | Yanashima et al. | |
| 2002/0026806 | A1 | 3/2002 | Tsuboe et al. | |
| 2002/0095950 | A1 | 7/2002 | Tsuboe et al. | |
| 2002/0140309 | A1 | 10/2002 | Yanashima et al. | |
| 2003/0056534 | A1 | 3/2003 | Tsuboe et al. | |
| 2003/0117753 | A1 | 6/2003 | Kato et al. | |
| 2004/0211213 | A1 * | 10/2004 | Tsuboe et al. | 62/468 |

FOREIGN PATENT DOCUMENTS

JP    2001-227778    8/2001

* cited by examiner

*Primary Examiner*—Marc Norman
(74) *Attorney, Agent, or Firm*—Antonelli, Terry, Stout and Kraus, LLP.

(57) ABSTRACT

A refrigerating machine having a compressor driven by a motor. The motor incorporates an armature with an iron core having a cage type conductor and a permanent magnet which is magnetized so as to enable the motor to operate as a synchronous motor. A bypass passage is provided between a discharge side of the compressor and a suction side of the compressor, a shut-off valve is provided for opening and closing the bypass passage, a pressure detecting device is provided for detecting a discharge pressure from the compressor and a current detector is provided for detecting a value of drive current for the compressor. The shut-off valve is opened and closed in accordance with the discharge pressure and the value of the drive current.

7 Claims, 8 Drawing Sheets

REFRIGERATING MACHINE

CROSS REFERENCE TO RELATED APPLICATION

This is a continuation of U.S. application Ser. No. 10/614,018, filed Jul. 8, 2003 now U.S. Pat. No. 6,832,488, the subject matter of which is incorporated by reference herein.

BACKGROUND OF THE INVENTION

The present invention relates to a refrigerating machine such as a refrigerator or an air-conditioner, using a vapor compression refrigerating cycle.

These years, due to a tendency of increase demands of prevention of earth warming and reduction in running cost, energy saving as to refrigerators and air-conditioners which causes energy consumption in a large part in tenants and buildings has been promoted. In order to enhance the efficiency of a refrigerating machine such as an air-conditioner or a refrigerator and to lower the costs thereof, as disclosed in JP-A-2001-227778, it has been known to use a built-in magnet synchronous motor for driving a compressor, having an armature incorporating a squirrel cage conductor and a permanent magnet so that the motor serves not only as an induction motor but also a synchronous motor.

In the above-mentioned conventional technology, of a plurality of compressors used in a refrigerating machine, the one compressor which is a variable speed compressor driven by a built-in magnet synchronous motor, is adapted to be subjected to an inverter drive, but the other one or more compressors which are constant speed compressors are driven by a commercial power source. However, although the compressor subjected to an inverter drive is driven with a relatively high degree of efficiency in the above-mentioned configuration, it has been not yet known in detail how to enhance the overall efficiency of the refrigerating machine.

In the case of synchronous operation of the built-in magnet synchronous motor, overload operation causes the built-in magnet synchronous motor to produce an insufficient torque which deteriorates the synchronous operation so that the armature stalls, result in running of abnormal current therethrough, and accordingly, there would cause a risk of occurrence of a dielectric breakdown of the armature windings.

BRIEF SUMMARY OF THE INVENTION

An object of the present invention is to provide a refrigerating machine using a plurality of compressor and having a comparatively enhanced degree of overall efficiency.

Further, another object of the present invention is to provide a refrigerating machine using a plurality of compressors, which has a degree of reliability that is comparatively enhanced.

To the end, according to the present invention, there is provided a refrigerating machine using a plurality of compressors driven by motors each of which comprises an armature including an iron core having a squirrel cage conductor and a permanent magnet which is magnetized so as to allow the motor to serve as a synchronous motor, and a compressor drive circuit for selectively driving the motors at a power source frequency by a commercial power and at a variable frequency by an inverter.

Further, according to the present invention, there is provided a refrigerating machine comprising a plurality of compressors driven by motors each including an armature having an iron core incorporating a permanent magnet, at least one of the compressors is driven at a variable speed by an inverter, and the other compressors are driven by motors each including an armature incorporating a squirrel cage conductor in addition to the permanent magnet.

Further, according to the present invention, there is provided a refrigerating machine including a plurality of compressors driven by motors each having an armature with an iron core incorporating a squirrel cage conductor and a permanent magnet, and the respective motors can be driven at a power source frequency by a commercial power source and also at a variable frequency by an inverter.

Further, in the refrigerating machine having the above-mentioned configuration, it is desirable to use a scroll compressor as the above-mentioned compressor.

Further, in the refrigerating machine having the above-mentioned configuration, it is preferable to wind armature windings concentrically in a stator in the motor.

Further, in the above-mentioned compressor having the above-mentioned configuration, it is preferable to use a scroll compressor as the above-mentioned compressor, and to wind armature windings concentrically in a stator of the motor.

Further, in the above-mentioned machine having the above-mentioned configuration, when it is determined that the inverter fails, it is preferable to drive at least one of the plurality of compressors by a commercial power source.

Further, in the refrigerating machine having the above-mentioned configuration, every one of the plurality of compressors is driven by a motor including an armature having an iron core which incorporates a squirrel cage conductor and a permanent magnet that is magnetized so as to allow the motor to serve as a synchronous motor.

In the refrigerating machine having the above-mentioned configuration, the plurality of compressors have a uniform type.

Further, in the refrigerating machine having the above-mentioned configuration, there is provided a pressure detecting device on the discharge side of the compressor which is therefore driven in accordance with a value detected by the pressure detecting device.

Present invention will be hereinbelow detailed in the form of preferred embodiments with reference to the accompanying drawing in which.

Other objects, features and advantages of the invention will become apparent from the following description of the embodiments of the invention taken in conjunction with the accompanying drawings.

DETAILED DESCRIPTION OF THE INVENTION

Figure 1:
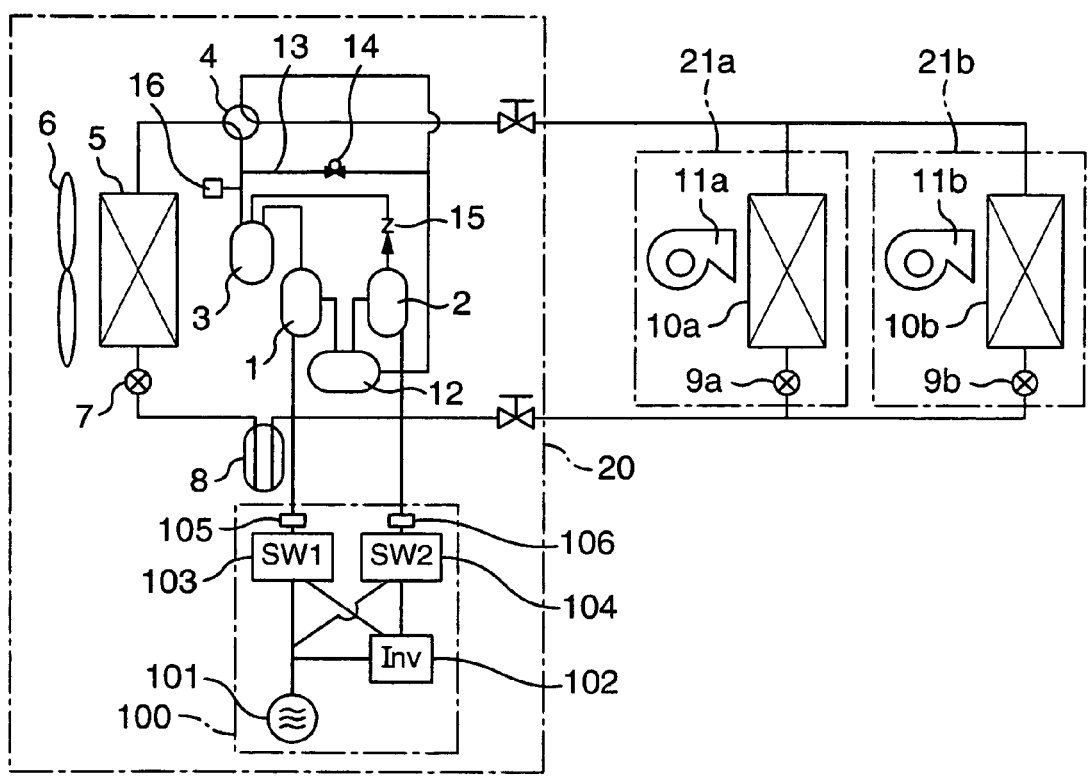
FIG. 1 is a block diagram illustrating a refrigerating cycle in an embodiment of the present invention.

Referring to FIG. 1 which shows a refrigerating cycle of an air-conditioner having two compressors 1, 2, there are shown a variable speed compressor 1 driven by an inverter and a constant speed compressor 2 driven by a commercial power source. Each of the compressors 1, 2 incorporates therein a built-in magnet synchronous motor (a self-start type synchronous motor) having an armature provided with a squirrel cage conductor which allows the motor to serve as an induction motor, and a permanent magnet which is bipolar-magnetized so as to allow the motor to serve as a synchronous motor. Further, a four way valve 4, an outdoor heat-exchanger 5, an outdoor expansion valve 7, a receiver 8, indoor expansion valves 9a, 9b, indoor heat-exchangers 10a, 10b and an accumulator 12 are connected in the mentioned order by means of a refrigerant pipe line so as to constitute a refrigerating cycle.

Figure 2:
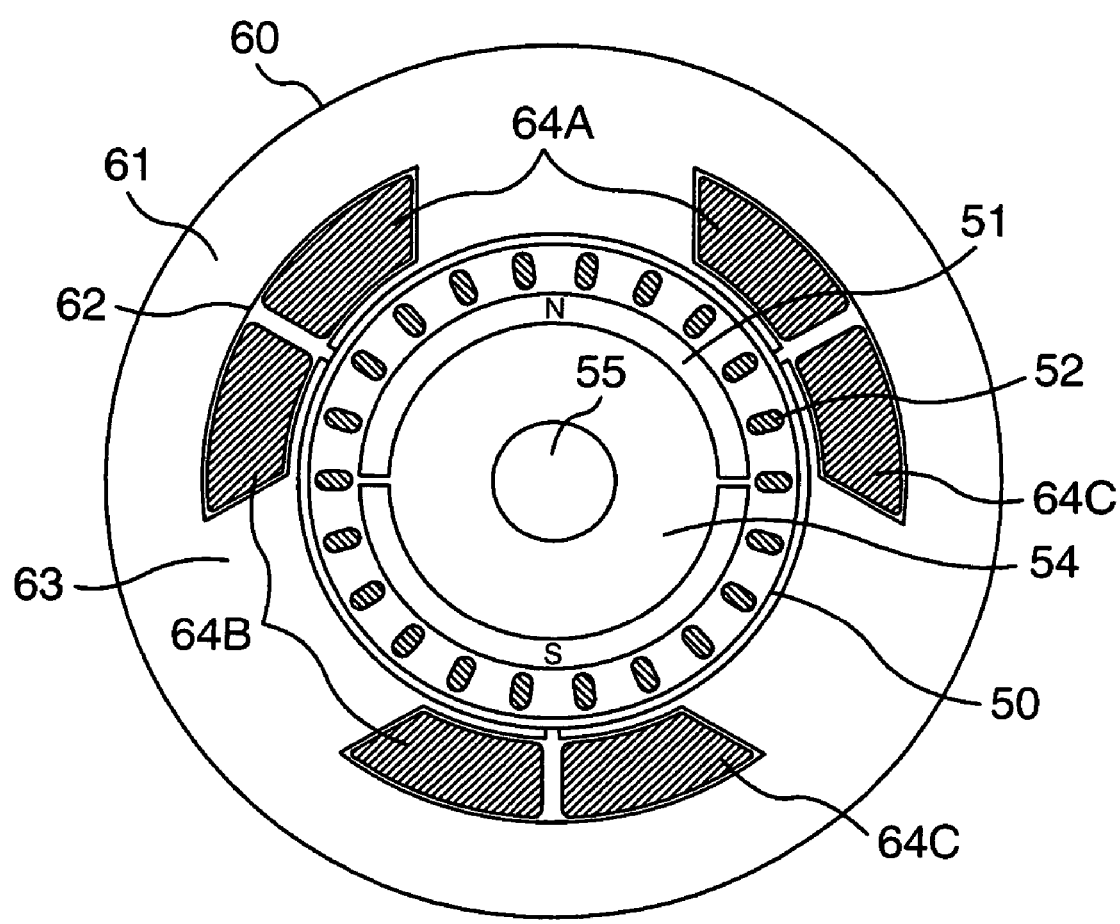
FIG. 2 is a cross-sectional view illustrating a self-start type synchronous motor used in the embodiment shown in FIG. 1.

Referring to FIG. 2 which is a detailed sectional view in a diametrical direction of the motor incorporated in each of the compressors 1, 2, there are shown an armature 50, and a squirrel cage conductor 52 provided around the outer peripheral surface of the armature 50. With this configuration, the armature 50 is rotated so as to allow the motor to serve as an induction motor. A permanent magnet 51 bipolar (N and S)-magnetized as shown is provided inside of the squirrel cage conductor 52. Further, there are provided an armature iron core 54 and a crankshaft 55 which are arranged in the mentioned order in a radially inward direction and which are coupled to the drive portion of the compressor as shown in FIG. 3.

Figure 3:
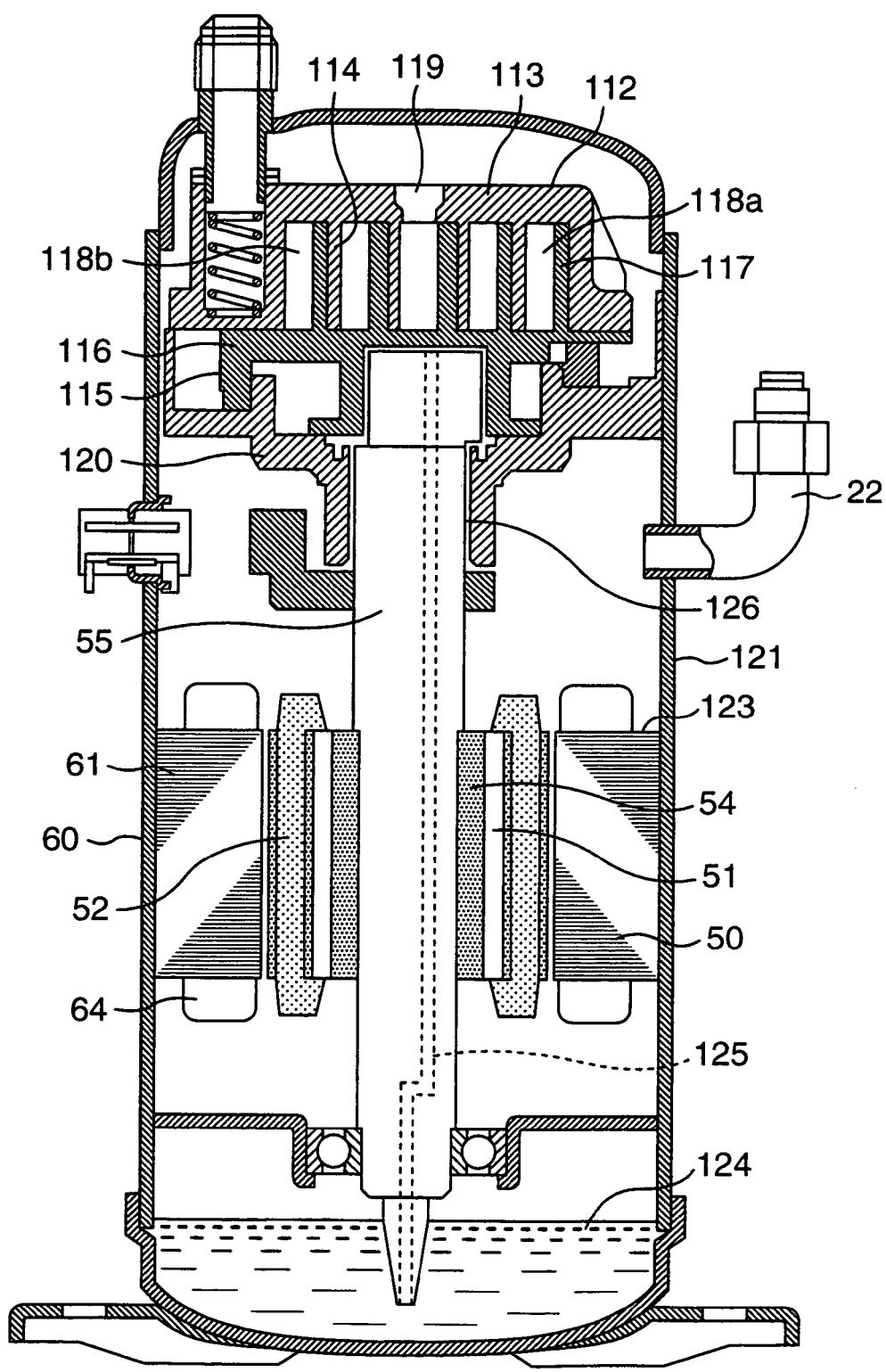
FIG. 3 is a sectional view illustrating a compressor used in the embodiment shown in FIG. 1.

Referring to FIG. 3 which is a cross-sectional view illustrating a structure of a compressor using a self-start type synchronous motor, the compressor has a compression mechanism portion composed of a spiral lap 114 which stands upright from an end plate 113 of a fixed scroll member 112, a spiral lap 117 which stands upright from an end plate 116 of an orbiting scroll member 115, being engaged with the spiral lap 114, and which is revolved by the crank shaft 55 so as to carry out compressive motion.

Of compression chambers 118a, 118b, . . . , defined between the orbiting scroll member 112 and the fixed scroll member 115 the one 118 which is located at the diametrically outmost side decreases its volume toward the centers of both scroll members 112, 115 for compression during the revolving motion, and compressed gas from the compression chamber 118 is discharged from a discharge port 119 communicated with the center part of the compression chamber 118.

The compressed gas discharged flows through a gas passage (which is not shown) formed in the fixed scroll member 112 and a frame 120 and then flows into a portion below the frame 120 in a pressure container 121, and is then discharged outside of the compressor, through a discharge pipe 22 incorporated to a side wall of the pressure container 121.

Further, this compressor encloses therein a drive motor 123 within the pressure container 121. An oil sump part 124 is defined below the drive motor 123. Oil in the oil sump part 124 is fed to sliding parts of the orbiting scroll member 115 and the crankshaft 55, a slide bearing 126 and the like by way of an oil hole 125 formed in the crankshaft 55, due to a pressure difference induced by the revolving motion.

The stator 60 is composed of a stator core 61, three slots 62 formed in the stator core 61, and three teeth 63 separated from one another by these slots 62. Armature windings 64 are concentrically wound on the teeth through the slots 62. In the figure, the armature windings 64 include U-phase windings 64A, V-phase windings 64B and W-phase windings 64C which are fed with power so as to rotate the armature.

With the above-mentioned configuration, since the stator 60 includes only concentrically wound windings, the dimensions of coil ends can be small-sized, and accordingly, it is possible to enhance the efficiency due to a decrease in copper loss caused by windings, and to miniaturize the compressor. Further, there is required only a concentrically winding machine for manufacturing the compressor drive motor, the manufacturing costs can be advantageously reduced. Further, (1) since a starting conductor provided in the armature is formed in a squirrel cage shape, a magnetic gap can be restrained to be minimum, and accordingly, effective magnetic fluxes can be ensured even during rated power operation; (2) since an induced current running through the conductor and magnetic fluxes inflowing into the armature from the stator side are orthogonal to each other, a torque characteristic can be ensured; and (3) since an armature manufacturing line (including a die-casting machine and the like) for conventional induction motors can be used as it is, the manufacturing costs can advantageously reduced.

Further, since the coil end parts can be small-sized, a larger internal volume can be ensured in the compressor, a sufficient space for a part for separating refrigerant fluid in order to reduce rise-up of oil can be ensured, and so forth, thereby it is possible to miniaturize an outdoor unit even using a plurality of compressors.

Next, explanation will be made of the operation of the self-start type synchronous motor.

In the case of the compressor 2 which is operated at a constant speed, when a power from a commercial power source 101 is applied to the armature windings, a rotating magnetic field is induced so that an induction magnetic field is applied to the squirrel cage conductor which therefore produce a torque. That is, the motor serves as an induction motor upon a start of the compressor, and then serves as a synchronous motor since the motor is led into a magnetic field of the permanent magnet so as to be rotated at a synchronous speed when the rotational speed of the compressor is gradually increased so as to approach 50 Hz (or 60 Hz) which is a frequency of the commercial power source 101. At this time, since no slip is caused substantially, substantially no loss is caused by a secondary current which is induced when the motor serves as an induction motor, thereby it is possible to operate the compressor with a high degree of efficiency.

In the case of the variable speed compressor 1 which is subjected to an inverter drive, since the drive frequency is gradually increased from the frequency of the commercial power source 101 through the intermediary of an inverter circuit 102, and accordingly, the motor can be simply accelerated up to its required synchronous speed in comparison with such a case that the motor is directly driven by the commercial power source 101.

Figure 4:
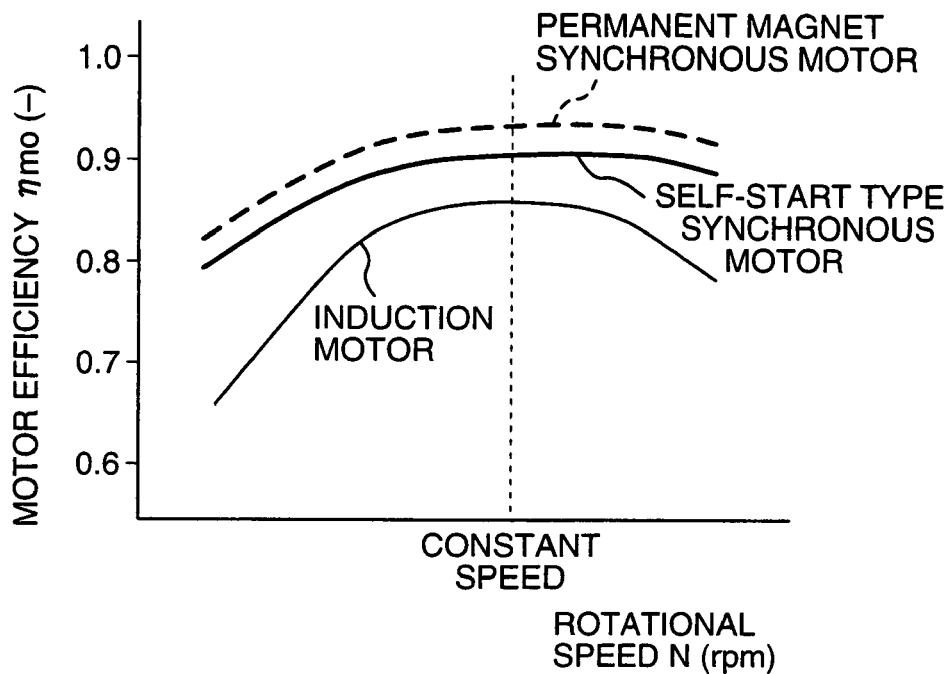
FIG. 4 is a graph showing degrees of efficiency of various kinds of motor with respect to a rotational speed.

Referring to FIG. 4 which shows motor efficiency characteristics of an induction motor, a permanent magnet synchronous motor and a self-start type synchronous motor, that is, speeds v.s. motor efficiency, the efficiency of the self-start type synchronous motor is higher than that of the induction motor, but is slightly lower than that of the permanent magnet synchronous motor. However, since the permanent magnet synchronous motor cannot be self-started directly by the commercial power source, it requires an inverter circuit.

Figure 5:
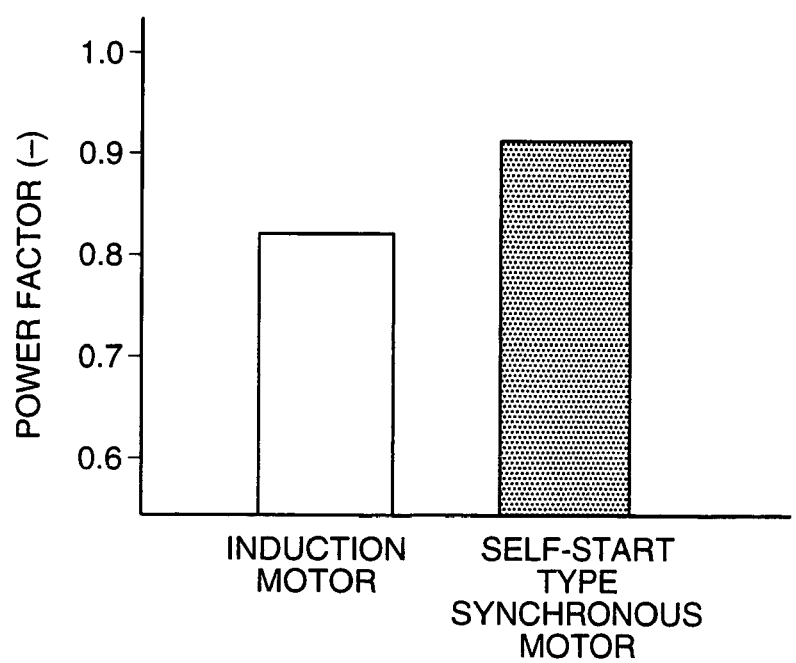
FIG. 5 is a graph showing power factors of an induction motor and a self-start type synchronous motor.

Referring to FIG. 5 which shows power factors of an induction motor and a self-start type synchronous motor, the induction motor lowers its power factor since it requires an exciting current accompanied with a slip, but the self-start type synchronous motor can operate with a high power factor since it does not require an exciting current when it carries out synchronous operation, and accordingly, it can reduce a power source capacity.

Referring again to FIG. 1, a compressor drive circuit 100 includes power source switches 103, 104 in order to supply a power from the commercial power source 101 to the compressors 1, 2, direct thereto or by way of an inverter circuit 102, and accordingly, the compressors 1, 2 are selectively operated under a drive at the frequency of the commercial power source 101 or under an inverter drive at a variable frequency. Thus, the compressor 2 can be operated also as a variable speed compressor by the inverter circuit, and on the contrary, the compressor 1 can be operated under a drive by the commercial power source, thereby it is possible to interchange both inverter drive and commercial power source drive with each other.

If the inverter circuit fails, both compressors 1, 2 can be connected, direct to the commercial power source 101 by means of the power source switches 103, 104, and accordingly, they serve as self-start type synchronous motors so as to continue the refrigerating cycle, thereby it is possible to avoid unnecessary stopping.

Further, with the use of the power source switches 103, 104, by alternatively operating, at predetermined time intervals, the compressors which are operated under an inverter drive at a high operation frequency due to temperature control, that is, by operating the compressors through rotation, the use lives of a plurality of compressors 1, 2 are averaged, respectively, thereby it is possible to enhance the reliability.

Figure 6:
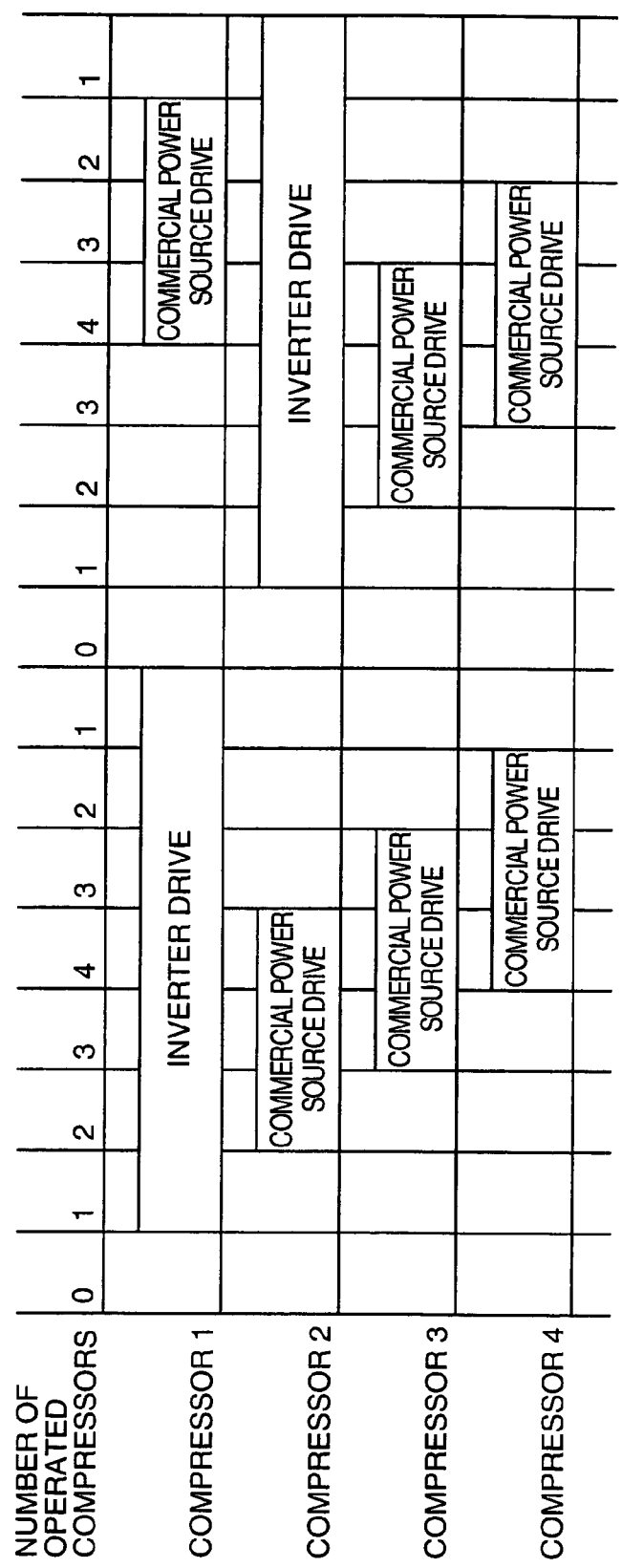
FIG. 6 is a time-chart showing rotation control of the compressors in the embodiment shown in FIG. 1.

Referring to FIG. 6 which shows an example of operation of four compressors through rotation, a compressor 1 which is operated under an inverter drive in accordance with an air-conditioning load is at first started, and then a compressor 2 which is driven at a constant speed by the commercial power source is started. Then, the compressors 2, 3, 4 are successively started at predetermined time intervals until a required number of compressors becomes a value required by the load. At this time, in accordance with total operation times of the compressors 1 to 4, which have respectively added up by operation time accumulating means, the compressors are operated in order from the one whose past total operation time is minimum.

When the air-conditioning load decreases so that the number of compressors operated at a constant speed is decreased, the compressors are successively stopped from the one whose total operation time which has become longest is stopped, except a compressor which is operated under an inverter drive, and the compressor which is operated under an inverter drive is finally stopped. Thus, the use lives of the compressors can be made to be uniformed, thereby it is possible to enhance the reliability of the overall air-conditioning machine.

Further, in order to determine the one of the compressors which is to be started, by generating a random number without using total operation times, which is any one of 1 to 4, that is, for example 2, the compressor 2 may be at first started. In this case, the memory capacity of a microcomputer can be reduced, in comparison with such a case that the operation time accumulating means are used for a plurality of the compressors, thereby it is possible to advantageously reduce the costs. Further, by using a self-start type synchronous motor for every of the compressors including those operated under an inverter drive and those operated under a commercial power source drive, the type of compressors to be used can be unified, thereby it is possible reduce manufacturing costs, managing costs and the like.

There would be presented a risk of a defective start due to an insufficient torque of the motor in the case of a large differential pressure between the discharge side and the suction side of the compressor when the self-start type synchronous motor is started by the commercial power source, and accordingly, a bypass passage 13 is incorporated from an oil separator 3 on the suction side of the compressor to an accumulator 12 on the discharge side thereof, as shown in FIG. 1, and a bypass passage shut-off valve 14 is connected in the bypass passage 14. With this configuration, the bypass passage shut-off valve 14 is opened so as to decrease the differential pressure between the discharge side and the suction side of the compressor upon a start, thereby it is possible to prevent occurrence of a defective start of the compressor.

Figure 9:
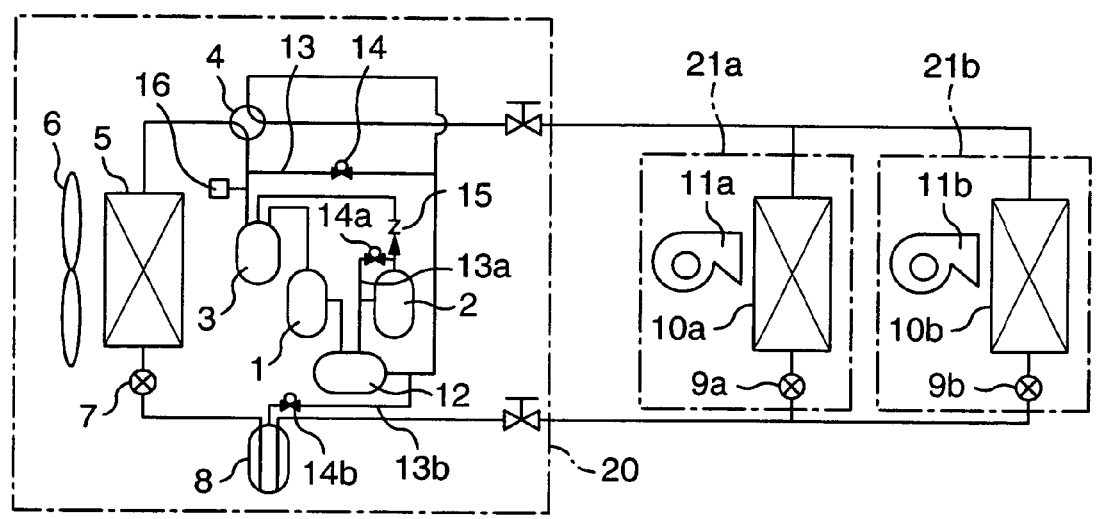
FIG. 9 is a block diagram illustrating a refrigerating cycle in another embodiment of the present invention.

Further, as shown in FIG. 9, instead of the bypass passage 13 as mentioned above, a bypass passage 13a may be provided from the discharge side of the compressor driven by the commercial power source, to the accumulator 12 or a passage 13b may be provided from the accumulator 12 to the receiver 8. In the case of the provision of the bypass passage 13b, when a shut-off valve 14B connected in the bypass passage 13b is opened, gas is led from the top part of the receiver 8 into the suction side of he compressor, and accordingly, the refrigerant at the inlet of the receiver has two phases so as to serve as two phase refrigerant at the outlet of the heat-exchanger serving as a condenser. Thus, the condensing pressure can be lowered so as to reduce the load of the compressor, thereby it is possible to facilitate a start thereof. Further, if the bypass passage is incorporated in the compressor between the high pressure part and the low pressure part in the compression mechanism portion, the compressor can be advantageously small-sized.

Further, a check-valve 5 is incorporated in the passage between the discharge side of the compressor 2 and the oil separator 3 on the discharge side of the compressor 1, as shown in FIG. 1, and accordingly, the differential pressure between the discharge side of the compressor 1 which has been started at first and which is operated under an inverter driven, and the suction side of the compressor 2 which is driven at second, is prevented from increasing, thereby it is possible to facilitate a start of the compressor 2.

Further, when the compressor 2 is stopped, a long time elapses until a high pressure which is held between the compressor 2 and the check valve 15 is decreased to a lower value, but if the bypass passage 13 is opened, the pressure can be rapidly lowered. Thereby, it is possible to shorten the time required from a stop of the compressor 2 to a restart thereof.

Even during the synchronous operation of the self-start type synchronous motor, insufficient torque is caused if the compressor falls in an overload operating condition, and accordingly, there would be caused a loss of synchronism. In order to prevent occurrence a loss of synchronism, a pressure detecting device 16 and current detectors 105 and 106 are provided on the discharge side of the compressor in order to carry out control for preventing occurrence of a loss of synchronism.

Figure 7:
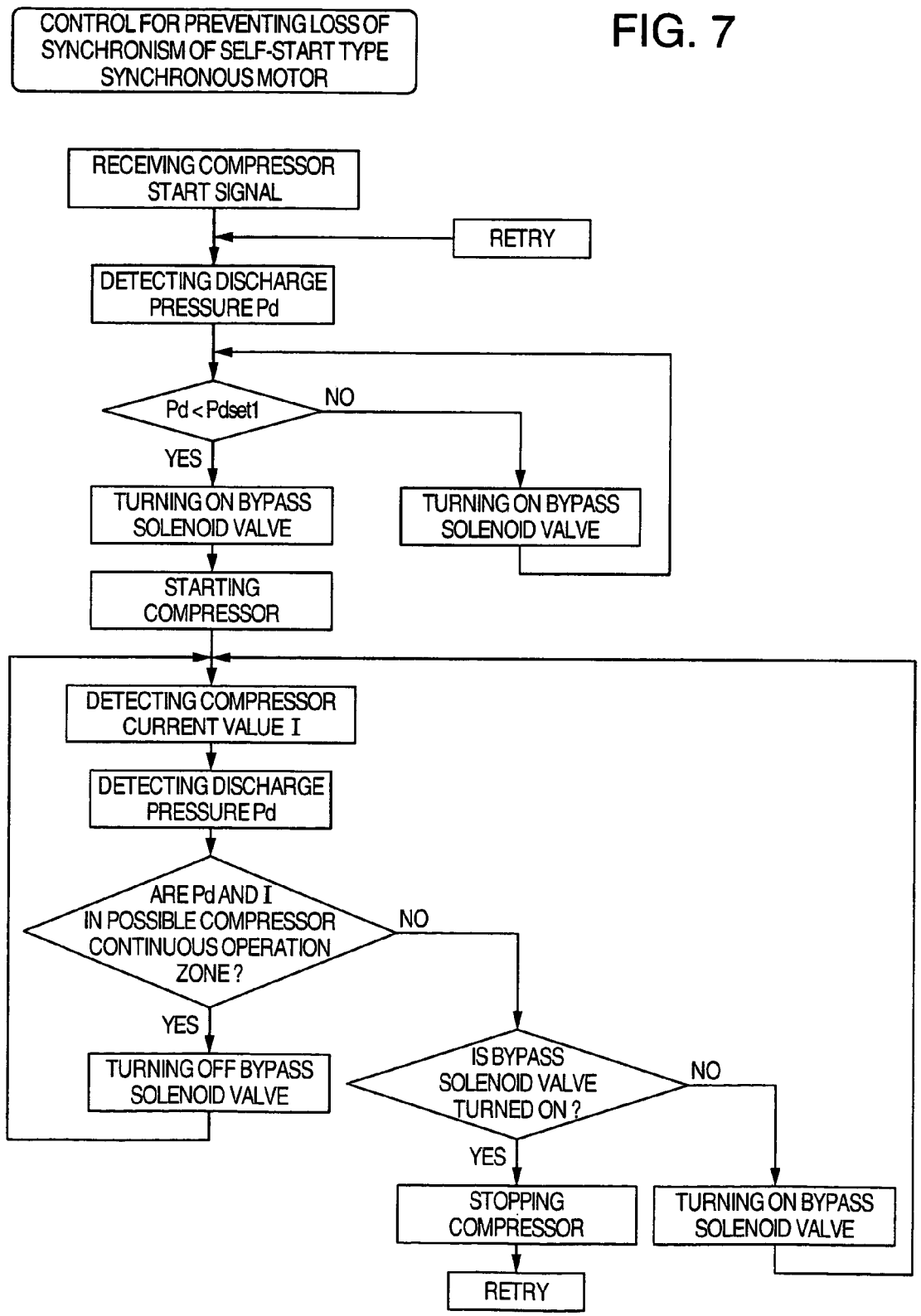
FIG. 7 is a flow-chart showing detune preventing control for a loss of synchronism of the self-start type synchronous motor in the embodiment shown in FIG. 1.

Referring to FIG. 7 which shows a flow-chart for the control for preventing occurrence of a loss of synchronism for a compressor. When a start signal for a compressor is received, a pressure is detected by the discharge pressure sensor so as to determine whether the discharge pressure is not less than a predetermined value Pdset1 or not is checked, and if it is true, the bypass passage is opened while the compressor is not started until the discharge pressure Pd becomes not greater than the value Pdset 1.

After the compressor is started, the following steps are carried out in accordance with a detected value from the current detector 106 and a detected value from the pressure detecting device 16.

Figure 8:
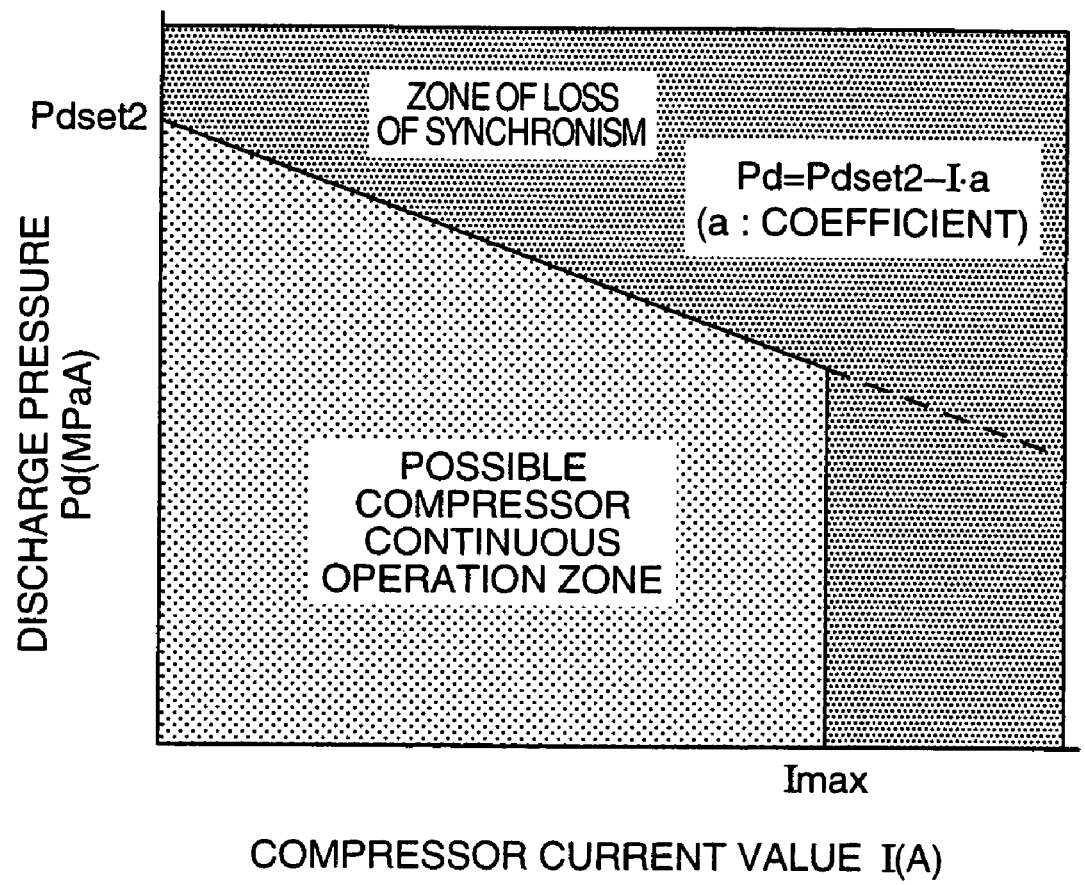
FIG. 8 is a graph showing a continuous operation zone of the self-start type synchronous motor in the embodiment shown in FIG. 1.

Referring to FIG. 8 which shows a zone where the compressor can be continuously operated, and a zone where the compressor causes a loss of synchronism, in accordance with the current value I and the discharge pressure Pd of the compressor. Specifically, there is present an allowable maximum current value (Imax) in the zone in which the compressor can be continuously operated, and below the maximum current, the allowable discharge pressure Pd is lowered as the current increases. Thus, whether or not the self-start type synchronous motor falls in the zone where the compressor is continuously operated, is successively determined, depending upon whether conditions Pd<Pdset2−I*a (where a is a coefficient) and I<Imax are satisfied or not. Further, if it falls in the zone where a loss of synchronism occurs, the bypass passage 13, 13a or 13b is opened in order to lower a load upon the motor. Further, it has already fallen in the zone where a loss of synchronism occurs even though the bypass passage is opened, the compressor is once stopped, and carry out retry control for a restart thereof.

In view of the configuration as sated above, since a scroll compressor is used as the compressor driven by the self-start type synchronous motor, the inertia of the rotating part is low, and variation in load torque is also small, thereby it is possible to widen the zone in which the compressor can be continuously operated.

As stated above, according to the present invention, there can be provided a refrigerating machine having a high degree of efficiency, and a high degree of reliability with reduced costs.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A refrigerating machine comprising a compressor driven by a motor, the motor incorporating an armature with an iron core having a cage type conductor and a permanent magnet which is magnetized so as to enable the motor to operate as a synchronous motor, a bypass passage between a discharge side of the compressor and a suction side of the compressor, a shut-off valve for opening and closing the bypass passage, a pressure detecting device for detecting a discharge pressure from the compressor, and a current detector for detecting a value of drive current for the compressor, wherein the shut-off valve is opened and closed in accordance with the discharge pressure and the value of the drive current.

2. A refrigerating machine according to claim 1, wherein the compressor is a scroll compressor.

3. A refrigerating machine comprising a plurality of compressors each driven by a motor having an armature with an iron core incorporating a permanent magnet, and including a first compressor driven at a variable speed by an inverter, and a second compressor having the armature with the iron core incorporating a cage type conductor in addition to the permanent magnet, a bypass passage between an output side and an input side of the plurality of compressors, a shut-off valve for opening and closing the bypass passage, a pressure detecting device for detecting a discharge pressure from the plurality of compressors, and a current detector for detecting a drive current for the second compressor, wherein the shut-off valve is opened and closed in accordance with the discharge pressure and the value of the drive current.

4. A refrigerating machine according to claim 3, further comprising a check valve provided in a passage between a discharge side of the second compressor to a discharge side of the first compressor, wherein the first compressor is preferentially started.

5. A refrigerating machine according to claim 3, wherein the plurality of compressors are all driven by motors each having an armature with an iron core incorporating a cage type conductor and a permanent magnet which is magnetized so as to enable the motor to operate as a synchronous motor.

6. A refrigerating machine comprising a plurality of compressors each driven by a motor having an armature with an iron core incorporating a cage type conductor and a permanent magnet, the motors for the compressors being capable of being driven by a source frequency of a commercial power source and a variable frequency of an inverter, a pressure detecting device for detecting a discharge pressure from the plurality of compressors, and current detectors for detecting drive currents of the respective compressors, wherein a differential pressure between an inlet side and an outlet side of the plurality of the compressors is reduced in accordance with the discharge side pressure and the drive currents.

7. A refrigerating machine according to claim 6, further comprising power source change-over switches for selectively one of supplying directly a commercial power to the motors and through an inverter circuit, and a compressor drive circuit for driving the respective motors by one a source frequency of the commercial power source and a variable frequency of an inverter.

* * * * *